(12) United States Patent
Zou et al.

(10) Patent No.: US 12,541,597 B2
(45) Date of Patent: Feb. 3, 2026

(54) ELECTRONIC DEVICE

(71) Applicant: CHINA UNIONPAY CO., LTD., Shanghai (CN)

(72) Inventors: Fen Zou, Shanghai (CN); Chengqian Chen, Shanghai (CN); Dingzhou Li, Shanghai (CN); Xin Wang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 133 days.

(21) Appl. No.: 18/570,417

(22) PCT Filed: Aug. 15, 2022

(86) PCT No.: PCT/CN2022/112614
§ 371 (c)(1),
(2) Date: Dec. 14, 2023

(87) PCT Pub. No.: WO2023/071424
PCT Pub. Date: May 4, 2023

(65) Prior Publication Data
US 2024/0281534 A1    Aug. 22, 2024

(30) Foreign Application Priority Data

Oct. 29, 2021  (CN) .......................... 202111275954.X

(51) Int. Cl.
*G06F 21/57*  (2013.01)
*G06F 21/53*  (2013.01)
(Continued)

(52) U.S. Cl.
CPC .............. *G06F 21/57* (2013.01); *G06F 21/53* (2013.01); *G06F 2221/033* (2013.01)

(58) Field of Classification Search
CPC ..... G06F 21/57; G06F 21/53; G06F 2221/033
(Continued)

(56) References Cited

U.S. PATENT DOCUMENTS

| 5,925,123 A * | 7/1999 | Tremblay ............ G06F 9/30189 |
| | | 712/E9.082 |
| 6,961,843 B2 * | 11/2005 | O'Connor ........... G06F 9/30145 |
| | | 717/148 |

(Continued)

FOREIGN PATENT DOCUMENTS

| CN | 107003889 A | 8/2017 |
| CN | 107689868 B | 2/2018 |

(Continued)

OTHER PUBLICATIONS

Konstantinos Markantonakis, Secure and Trusted Application Execution on Embedded Devices; Researchgate: year:2015; pp. 1-21.*

(Continued)

*Primary Examiner* — Monjur Rahim
(74) *Attorney, Agent, or Firm* — ANOVA LAW GROUP, PLLC

(57) ABSTRACT

An electronic device and a trusted application calling method are provided. After a client application initiates call information, a trusted application development platform receives the call information, determines a native trusted application corresponding to first identification information of the electronic device carried by the calling information from native trusted applications corresponding to at least two (or more) TEE OSs connected to the trusted application development platform, and sends the calling information to the native trusted applications corresponding to the first identification information. The native trusted application corresponding to the first identification information receives the calling information, determines a bytecode trusted application corresponding to the second identification informa- (Continued)

tion from at least one bytecode trusted application installed in the native trusted application according to the second identification information carried by the calling information, and calls the bytecode trusted application corresponding to the second identification information.

20 Claims, 6 Drawing Sheets

(51) Int. Cl.
 *G06F 21/64* (2013.01)
 *H04L 9/08* (2006.01)
(58) Field of Classification Search
 USPC .......................................................... 726/22
 See application file for complete search history.

(56) References Cited

U.S. PATENT DOCUMENTS

| | | | | |
|---|---|---|---|---|
| 7,437,718 | B2* | 10/2008 | Fournet | G06F 21/577 |
| | | | | 717/133 |
| 8,117,587 | B1* | 2/2012 | Testardi | G06F 11/3624 |
| | | | | 717/100 |
| 9,471,353 | B1* | 10/2016 | Christopher | G06F 9/45504 |
| 9,703,611 | B1* | 7/2017 | Christopher | G06F 9/5027 |
| 11,513,780 | B2* | 11/2022 | Liu | G06F 21/51 |
| 2003/0033539 | A1* | 2/2003 | Cheng | H04L 63/102 |
| | | | | 726/29 |
| 2005/0136939 | A1* | 6/2005 | Mountain | H04L 67/02 |
| | | | | 455/453 |
| 2006/0212840 | A1* | 9/2006 | Kumamoto | G06F 9/461 |
| | | | | 717/100 |
| 2006/0218536 | A1* | 9/2006 | Kirilline | G06F 9/455 |
| | | | | 717/127 |
| 2009/0327908 | A1* | 12/2009 | Hayton | G06F 21/6218 |
| | | | | 715/744 |
| 2010/0211627 | A1 | 8/2010 | Roseborough | |
| 2012/0246487 | A1* | 9/2012 | Gu | G06F 21/14 |
| | | | | 713/190 |
| 2013/0276056 | A1* | 10/2013 | Epstein | G06F 21/604 |
| | | | | 726/1 |
| 2014/0317686 | A1* | 10/2014 | Vetillard | G06F 21/74 |
| | | | | 726/2 |
| 2016/0191246 | A1* | 6/2016 | Varadarajan | H04L 9/3234 |
| | | | | 713/2 |
| 2019/0140836 | A1* | 5/2019 | Novak | G06F 21/74 |
| 2019/0305927 | A1* | 10/2019 | Bhunia | G06F 21/76 |
| 2020/0210216 | A1* | 7/2020 | Boilen | G06F 9/45508 |
| 2020/0364937 | A1* | 11/2020 | Selbrede | G06T 19/20 |
| 2021/0050990 | A1* | 2/2021 | Hearn | G06F 16/184 |
| 2021/0150524 | A1* | 5/2021 | Yan | G06F 21/602 |
| 2021/0328791 | A1* | 10/2021 | Wei | G06F 21/57 |
| 2024/0281534 | A1* | 8/2024 | Zou | G06F 21/57 |

FOREIGN PATENT DOCUMENTS

| | | |
|---|---|---|
| CN | 112926032 A | 6/2021 |
| CN | 114021141 A | 2/2022 |
| CN | 114036524 A | 2/2022 |
| TW | 201729089 A | 8/2017 |

OTHER PUBLICATIONS

The World Intellectual Property Organization (WIPO) International Search Report for PCT/CN2022/112614 Oct. 27, 2022 7 pages ( including translation).

* cited by examiner

ELECTRONIC DEVICE

CROSS-REFERENCE TO RELATED APPLICATION

This application is a national phase entry under 35 U.S.C § 371 of International Application No. PCT/CN2022/112614, filed on Aug. 15, 2022, which claims the priority of Chinese Patent Application No.: 202111275954.X, filed Oct. 29, 2021, the content of all of which is incorporated herein by reference in their entirety.

TECHNICAL FIELD

The present disclosure generally relates to the field of trusted application calling technology and, more particularly, relates to an electronic device, a trusted application calling method, device, and apparatus, and a medium.

BACKGROUND

The development of mobile communication technology has resulted in the rapid development of mobile terminal technology. A modern mobile terminal device provides a powerful and flexible rich execution environment (REE), but it also makes the device vulnerable to security threats. A trusted execution environment (TEE) is a technical solution proposed to solve the security risks of current mobile terminal devices. TEE and REE run in parallel on a same device. TEE is able to ensure the storage, processing and protection of sensitive data in a trusted environment, and provides a safe execution environment for authorized security software (trusted software). Therefore, protection, confidentiality, integrity, and data access enable end-to-end security. Among them, a trusted application (TA) runs on the TEE, and a client application (CA) runs on the REE. The CA uses the security functions provided by the TEE and TA by calling the TA.

Traditional trusted applications are generally based on machine code programs running on a trusted execution environment operating system (TEE OS). For a same application, it is usually necessary to develop different versions of the trusted application for different TEE OS hardware platforms such as Huawei iTrustee or Qualcomm QSEE, to adapt to the usage requirements of different TEE OS hardware platforms. Therefore, it is necessary to develop trusted applications that can be applied to multiple TEE OS and can be used across different TEE OS hardware platforms.

However, even if a trusted application is developed that is applicable to multiple TEE OS and can be used across different TEE OS hardware platforms, how to manage the trusted application is still a technical problem that needs to be solved urgently.

SUMMARY

The present disclosure provides an electronic device, a trusted application calling method, device, and apparatus, and a medium, to accurately manage trusted applications.

One aspect of the present disclosure provides an electronic device. The electronic device includes a client application CA and a trusted application development platform.

The CA is configured to initiate call information of a native trusted application of a trusted execution environment operating system corresponding to the CA and connected to the trusted application development platform, where the call information carries first identification information of the electronic device and second identification information of a bytecode trusted application of any application.

The trusted application development platform is configured to receive the calling information, determine the native trusted application corresponding to the first identification information from native trusted applications corresponding to at least two trusted execution environment operating systems respectively connected to the trusted application development platform according to the first identification information, and send the calling information to the native trusted application corresponding to the information.

The native trusted application corresponding to the first identification information is configured to receive the calling information, determine a bytecode trusted application corresponding to the second identification information from at least one bytecode trusted application installed in the native trusted application according to the second identification information, and call the bytecode trusted application corresponding to the second identification information according to the calling information.

The bytecode trusted application corresponding to the second identification information is configured to receive a call of the native trusted application corresponding to the first identification information, and perform corresponding operations based on the call of the native trusted application corresponding to the first identification information.

In one possible implementation, the electronic device further includes:

a creation module, configured to create the trusted application development platform based on bytecode technology that supports cross-platform functions, where the trusted application development platform connects the native trusted applications corresponding to the at least two trusted execution environment operating systems.

In one possible implementation, the native trusted application corresponding to the first identification information is configured to create a native trusted application instance when the received calling information is an access request, open a native trusted application session based on the native trusted application instance, and send a first instruction for session opening to the bytecode trusted application corresponding to the second identification information.

The bytecode trusted application corresponding to the second identification information is configured to create a bytecode trusted application instance when receiving the first instruction, and open a bytecode trusted application session according to the bytecode trusted application instance.

In one possible implementation, the native trusted application corresponding to the first identification information is configured to: when the received calling information is a calling instruction, forward the calling instruction to the bytecode trusted application corresponding to the second identification information.

In one possible implementation, the bytecode trusted application corresponding to the second identification information is further configured to: identify location information of own data storage location of the bytecode trusted application, and return the location information to the native trusted application corresponding to the first identification information.

The native trusted application corresponding to the first identification information is further configured to: when receiving the location information, forward the calling instruction to the bytecode trusted application corresponding the second identification information identified by the location information.

In one possible implementation, the bytecode trusted application corresponding to the second identification information is further configured to return execution results of the calling instruction to the native trusted application corresponding to the first identification information.

The native trusted application corresponding to the first identification information is further configured to transmit the execution results to the CA.

In one possible implementation, the native trusted application corresponding to the first identification information is further configured to: when the received calling information is session closure information, send a second instruction for session closure to the bytecode trusted application corresponding to the second identification information and close the native trusted application session;

the bytecode trusted application corresponding to the second identification information is further configured to: when receiving the second instruction, close the bytecode trusted application session and destroy the bytecode trusted application instance; and the native trusted application corresponding to the first identification information is further configured to destroy the native trusted application instance.

In one possible implementation, the native trusted application corresponding to the first identification information is further configured to: configure an independent subdirectory for each bytecode trusted application respectively; and, for each bytecode trusted application, based on the independent subdirectory corresponding to the bytecode trusted application, configure a specific access path for the bytecode trusted application, such that the bytecode trusted application is able to access the file information in the corresponding independent subdirectory.

In one possible implementation, the electronic device further includes a trusted execution environment operating system TEE OS.

the TEE OS is configured to receive the calling information initiated by the CA and send the calling information to the trusted application development platform; and the trusted application development platform is configured to receive the calling information sent by the TEE OS through a first global platform GP interface provided by the TEE OS or an own interface.

In one possible implementation, the native trusted application corresponding to the first identification information is further configured to call the bytecode trusted application corresponding to the second identification information based on a preset conversion interface; and the bytecode trusted application corresponding to the second identification information is configured to receive the call of the native trusted application corresponding to the first identification information based on a preset second GP interface.

Another aspect of the present disclosure provides a trusted application calling method. The method is applied to a native trusted application. The method includes:

receiving call information sent by a trusted application development platform, where: the call information carries first identification information of an electronic device and second identification information of a bytecode trusted application of any application; and the calling information is sent by the trusted application development platform when the trusted application development platform determines the native trusted application corresponding to the first identification information from native trusted applications corresponding to at least two trusted environment operating systems connected to the trusted application development platform respectively according to the first identification information, after the trusted application development platform receives calling information initiated by a client application CA to a native trusted application of a trusted environment operating system corresponding to the CA and connected to the trusted application development platform; and determining a bytecode trusted application corresponding to the second identification information from at least one bytecode trusted application installed in the native trusted application according to the second identification information, and calling the bytecode trusted application corresponding to the second identification information according to the calling information, such that the bytecode trusted application corresponding to the second identification information receives a call of the native trusted application corresponding to the first identification information and performs corresponding operations based on the call of the native trusted applications corresponding to the first identification information.

In one possible implementation, when the received calling information is an access request, calling the bytecode trusted application corresponding to the second identification information according to the calling information includes:

creating a native trusted application instance, opening a native trusted application session based on the native trusted application instance, and sending a first instruction for session opening to the bytecode trusted application corresponding to the second identification information, such that the bytecode trusted application corresponding to the second identification information creates a bytecode trusted application instance when receiving the first instruction and opens a bytecode trusted application session according to the bytecode trusted application instance.

In one possible implementation, when the received calling information is a calling instruction, calling the bytecode trusted application corresponding to the second identification information according to the calling information includes:

forwarding the calling instruction to the bytecode trusted application corresponding to the second identification information.

In one possible implementation, after receiving the calling information sent by the trusted application development platform and before forwarding the calling instruction to the bytecode trusted application corresponding to the second identification information, the method further includes:

receiving location information sent by the bytecode trusted application corresponding to the second identification information, where the location information is sent by the bytecode trusted application corresponding to the second identification information when identifying location information of own data storage location.

Forwarding the calling instruction to the bytecode trusted application corresponding to the second identification information includes:

forwarding the calling instruction to the bytecode trusted application corresponding the second identification information identified by the location information, according to the location information.

In one possible implementation, the method further includes:

returning execution results of the calling instruction to the native trusted application corresponding to the first identification information, where the execution results are sent by the bytecode trusted application corresponding the second identification information when finishing execution of the calling instruction.

In one possible implementation, when the received calling information is session closure information, calling the bytecode trusted application corresponding to the second identification information according to the calling information includes:

closing the native trusted application session and sending a second instruction for session closure to the bytecode trusted application corresponding to the second identification information, such that the bytecode trusted application corresponding to the second identification information closes the bytecode trusted application session and destroys the bytecode trusted application instance when receiving the second instruction; and destroying the native trusted application instance.

In one possible implementation, the method further includes: configuring an independent subdirectory for each bytecode trusted application respectively; and, for each bytecode trusted application, based on the independent subdirectory corresponding to the bytecode trusted application, configuring a specific access path for the bytecode trusted application, such that the bytecode trusted application is able to access the file information in the corresponding independent subdirectory.

In one possible implementation, calling the bytecode trusted application corresponding to the second identification information includes:

calling the bytecode trusted application corresponding to the second identification information based on a preset conversion interface.

Another aspect of the present disclosure provides another trusted application calling method. The method is applied to a bytecode trusted application. The method includes:

receiving a call of a native trusted application corresponding to first identification information, where: the call is initiated by the native trusted application corresponding to the first identification information to the bytecode trusted application corresponding to the second identification information when the native trusted application corresponding to the first identification information determines the bytecode trusted application corresponding to the second identification information from at least one bytecode trusted application installed in the native trusted application corresponding to the first identification information according to the second identification information carried in calling information after the native trusted application corresponding to the first identification information receives the calling information sent by the trusted application development platform; and the calling information is sent by the trusted application development platform when the trusted application development platform determines the native trusted application corresponding to the first identification information from native trusted applications corresponding to at least two trusted environment operating systems connected to the trusted application development platform respectively according to the first identification information, after the trusted application development platform receives the calling information initiated by a client application CA to a native trusted application of a trusted environment operating system corresponding to the CA and connected to the trusted application development platform;

and, performing corresponding operations based on the call of the native trusted application corresponding to the first identification information.

In one possible implementation, performing the corresponding operations based on the call of the native trusted application corresponding to the first identification information includes:

when receiving a first instruction for session opening sent by the native trusted application corresponding to the first identification information, creating a bytecode trusted application instance and opening a bytecode trusted application session according to the bytecode trusted application instance, where the first instruction is sent by the native trusted application corresponding to the first identification information when the native trusted application corresponding to the first identification information creates a native trusted application instance and opens a native trusted application session according to the native trusted application instance after recognizing that the received calling information is an access request.

In one possible implementation, after opening the bytecode trusted application session and before receiving a calling instruction forwarded by the native trusted application corresponding to the first identification information, the method further includes:

identifying location information of own data storage location of the bytecode trusted application, and return the location information to the native trusted application corresponding to the first identification information, such that the native trusted application corresponding to the first identification information forwards the calling instruction to the bytecode trusted application corresponding the second identification information identified by the location information when receiving the location information.

In one possible implementation, the method further includes:

returning execution results of the calling instruction to the native trusted application corresponding to the first identification information, such that the native trusted application corresponding to the first identification information transmits the execution results to the CA.

In one possible implementation, performing the corresponding operations according to the call of the native trusted application corresponding to the first identification information includes:

when receiving a second instruction for session closure sent by the native trusted application corresponding to the first identification information, closing the bytecode trusted application session and destroying the bytecode trusted application instance, where the second instruction is sent by the native trusted application corresponding to the first identification information to the bytecode trusted application corresponding to the second identification information when the calling information received by the native trusted application corresponding to the first identification information is session closure information.

In one possible implementation, receiving the call of the native trusted application corresponding to the first identification information includes:

receiving the call of the native trusted application corresponding to the first identification information based on a preset second GP interface.

Another aspect of the present disclosure provides a trusted application calling device. The device is applied to a native trusted application. The device includes:

a receiving module, configured to receive call information sent by a trusted application development platform, where: the call information carries first identification information of an electronic device and second identification information of a bytecode trusted application of any application; and the calling information is sent by the trusted application development platform when the trusted application development platform determines a native trusted application corresponding to the first identification information from native trusted applications corresponding to at least two trusted environment operating systems connected to the trusted application development platform respectively according to the first identification information, after the trusted application development platform receives calling information initiated by a client application CA to a native trusted application of a trusted environment operating system corresponding to the CA and connected to the trusted application development platform; and a calling module, configured to: determine a bytecode trusted application corresponding to the second identification information from at least one bytecode trusted application installed in the native trusted application according to the second identification information, and call the bytecode trusted application corresponding to the second identification information according to the calling information, such that the bytecode trusted application corresponding to the second identification information receives a call from the native trusted application corresponding to the first identification information and performs corresponding operations based on the call of the native trusted applications corresponding to the first identification information.

In one possible implementation, the calling module is configured to: when the received calling information is an access request, create a native trusted application instance, open a native trusted application session based on the native trusted application instance, and send a first instruction for session opening to the bytecode trusted application corresponding to the second identification information, such that the bytecode trusted application corresponding to the second identification information creates a bytecode trusted application instance when receiving the first instruction, and opens a bytecode trusted application session according to the bytecode trusted application instance.

In one possible implementation, the calling module is configured to: when the received calling information is a calling instruction, forward the calling instruction to the bytecode trusted application corresponding to the second identification information.

In one possible implementation, the calling module is further configured to: receive location information sent by the bytecode trusted application corresponding to the second identification information, where the location information is sent by the bytecode trusted application corresponding to the second identification information when identifying location information of own data storage location.

The calling module is further configured to: forward the calling instruction to the bytecode trusted application corresponding the second identification information identified by the location information, according to the location information.

In one possible implementation, the device further includes:

a transmission module, configured to return execution results of the calling instruction to the native trusted application corresponding to the first identification information, where the execution results are sent by the bytecode trusted application corresponding the second identification information when finishing execution of the calling instruction.

In one possible implementation, the calling module is further configured to: when the received calling information is session closure information, close the native trusted application session and send a second instruction for session closure to the bytecode trusted application corresponding to the second identification information, such that the bytecode trusted application corresponding to the second identification information closes the bytecode trusted application session and destroys the bytecode trusted application instance when receiving the second instruction; and destroy the native trusted application instance.

In one possible implementation, the device further includes:

a configuration module for configuring an independent subdirectory for each bytecode trusted application respectively; and, for each bytecode trusted application, based on the independent subdirectory corresponding to the bytecode trusted application, configuring a specific access path for the bytecode trusted application, such that the bytecode trusted application is able to access the file information in the corresponding independent subdirectory.

In one possible implementation, the calling module is configured to call the bytecode trusted application corresponding to the second identification information based on a preset conversion interface.

Another aspect of the present disclosure provides another trusted application calling device. The device is applied to a bytecode trusted application. The device includes:

a second receiving module, configured to receive a call of a native trusted application corresponding to first identification information, where: the call is initiated by the native trusted application corresponding to the first identification information to the bytecode trusted application corresponding to the second identification information when the native trusted application corresponding to the first identification information determines the bytecode trusted application corresponding to the second identification information from at least one bytecode trusted application installed in the native trusted application corresponding to the first identification information according to the second identification information carried in calling information after the native trusted application corresponding to the first identification information receives the calling information sent by the trusted application development platform; and the calling information is sent by the trusted application development platform when the trusted application development platform determines a native trusted application corresponding to the first identification information from native trusted applications corresponding to at least two trusted environment operating systems connected to the trusted application development platform respectively according to the first identification information, after the trusted application development platform receives calling information initiated by a client application CA to a native trusted application of a trusted environment operating system corresponding to the CA and connected to the trusted application development platform;

and, an execution module, configured to perform corresponding operations based on the call of the native trusted application corresponding to the first identification information.

In one possible implementation, the execution module is configured for: when receiving a first instruction for session opening sent by the native trusted application corresponding to the first identification information, creating a bytecode trusted application instance and opening a bytecode trusted application session according to the bytecode trusted application instance, where the first instruction is sent by the native trusted application corresponding to the first identification information when the native trusted application corresponding to the first identification information creates a native trusted application instance and opens a native trusted application session according to the native trusted application instance after recognizing that the received calling information is an access request.

In one possible implementation, the execution module is further configured for:

identifying location information of own data storage location of the bytecode trusted application, and return the location information to the native trusted application corresponding to the first identification information, such that the native trusted application corresponding to the first identification information forwards the calling instruction to the bytecode trusted application corresponding the second identification information identified by the location information when receiving the location information.

In one possible implementation, the execution module is further configured for: returning execution results of the calling instruction to the native trusted application corresponding to the first identification information, such that the native trusted application corresponding to the first identification information transmits the execution results to the CA.

In one possible implementation, the execution module is configured for:

when receiving a second instruction for session closure sent by the native trusted application corresponding to the first identification information, closing the bytecode trusted application session and destroying the bytecode trusted application instance, where the second instruction is sent by the native trusted application corresponding to the first identification information to the bytecode trusted application corresponding to the second identification information when the calling information received by the native trusted application corresponding to the first identification information is session closure information.

In one possible implementation, the second receiving module is configured to:

receive the call of the native trusted application corresponding to the first identification information based on a preset second GP interface.

Another aspect of the present disclosure provides an electronic device. The electronic device at least includes a processor and a memory. The processor is configured to execute a computer program stored in the memory to implement steps in the above trusted application calling methods.

Another aspect of the present disclosure provides a computer-readable storage medium, configured to store a computer program. When being executed by a processor, the computer program implements steps in the above trusted application calling methods.

In the present disclosure, after the CA initiates the call information, the trusted application development platform may receive the call information, determine the native trusted applications corresponding to the first identification information of the electronic device carried by the calling information from native trusted applications corresponding to at least two (or more) TEE OSs connected to the trusted application development platform, and send the calling information to the native trusted applications corresponding to the first identification information. The native trusted application corresponding to the first identification information of the device may receive the calling information, determine the bytecode trusted application corresponding to the second identification information from at least one bytecode trusted application installed in the native trusted application according to the second identification information carried by the calling information, and call the bytecode trusted application corresponding to the second identification information. The bytecode trusted application corresponding to the second identification information may receive the call of the native trusted application corresponding to the first identification information, and perform the corresponding operations according to the call of the native trusted application corresponding to the first identification information. Therefore, the bytecode trusted application of the second identification information may be accurately called, and multiple bytecode trusted applications may be managed in the native trusted application to achieve the purpose of accurately managing trusted applications.

DETAILED DESCRIPTION

To accurately manage trusted applications, the present disclosure provides an electronic device, a trusted application calling method, apparatus and device, and a medium.

To make the purpose and implementation of the present disclosure clearer, the exemplary embodiments of the present disclosures will be clearly and completely described below in conjunction with the drawings in the exemplary embodiments of the present disclosure. Obviously, the described exemplary embodiments are only part of the embodiments of the present disclosure, and not all the embodiments.

The terms "first", "second", "third", etc. in the description and claims of the present disclosure and the above-mentioned drawings are used to distinguish similar or same-type objects or entities, and do not necessarily mean to limit specific priority or sequential order unless otherwise noted. It is to be understood that the terms so used are interchangeable under appropriate circumstances.

The terms "include", "have" and any variations thereof are intended to cover not exclusive inclusion. For example, a product or device including a list of components need not be limited to all components expressly listed, but may include any components not expressly listed or inherent to these products or equipment.

Finally, it should be noted that the above embodiments are only used to illustrate the technical solution of the present disclosure, but not to limit the scope of the present disclosure. Although the present disclosure has been described in detail with reference to the foregoing embodiments, those of ordinary skill in the art should understand that the technical solutions described in the foregoing embodiments may be modified, or some or all of the technical features may be equivalently replaced; and these modifications or substitutions do not deviate from the essence of the corresponding technical solutions from the technical solutions of the embodiments of the present disclosure.

Embodiment 1

Figure 1:
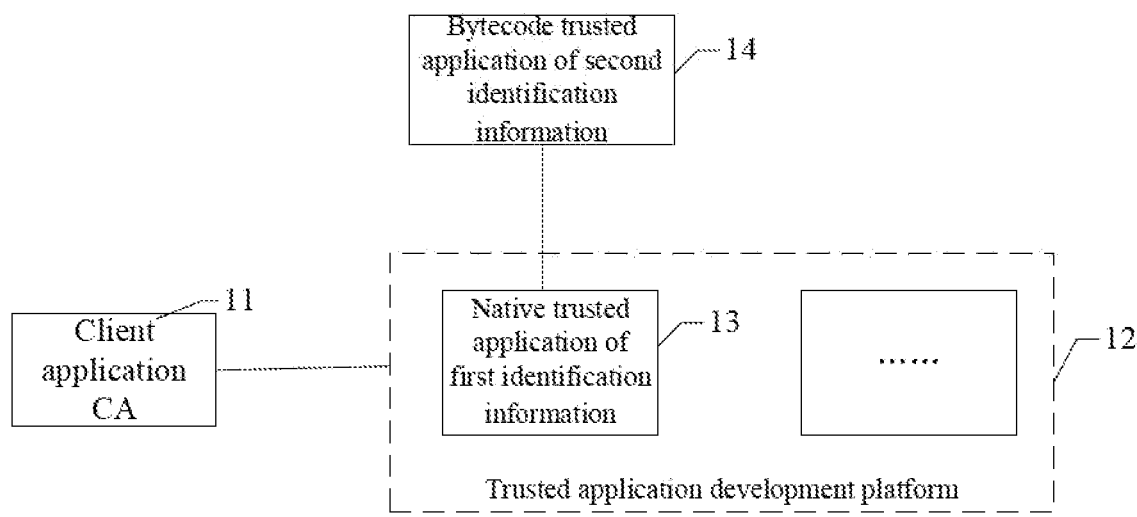
FIG. 1 illustrates an exemplary electronic device according to various disclosed embodiments of the present disclosure.

FIG. 1 shows an exemplary electronic device provided by one embodiment of the present disclosure. The electronic device may include a client application (CA) 11 and a trusted application development platform 12.

The CA11 may be configured to initiate call information of a native trusted application of a trusted execution environment operating system corresponding to the CA11 and connected to the trusted application development platform 12. The call information may carry first identification information of the electronic device and second identification information of a bytecode trusted application of any application.

The trusted application development platform 12 may be configured to: receive the calling information; according to the first identification information, determine a native trusted application corresponding to the first identification information from native trusted applications respectively corresponding to at least two trusted execution environment operating systems connected with the trusted application development platform 12; and send the calling information to the native trusted application corresponding to the first identification information.

The native trusted application 13 corresponding to the first identification information may be configured to receive the calling information; according to the second identification information, determine a bytecode trusted application 14 corresponding to the second identification information from at least one bytecode trusted application installed in the native trusted application 13; and call the bytecode trusted application 14 corresponding to the second identification information according to the calling information.

The bytecode trusted application 14 corresponding to the second identification information may be used to: receive the call of the native trusted application 13 corresponding to the first identification information, and perform corresponding operations according to the call of the native trusted application 13 corresponding to the first identification information.

In the present disclosure, based on the bytecode technology that supports cross-platform functions (such as WebAssembly bytecode technology, etc.), native TAs corresponding to multiple TEE OSs may be constructed to the trusted application development platform 12. The trusted application development platform 12 may provide a unified development interface upwards. For example, the trusted application development platform 12 may provide a unified global platform (GP) interface upwards. Trusted application developers may no longer need to pay attention to the specific version of the TEE OS hardware platform, and only need to develop a trusted application corresponding to an application (for convenience of description, it is called a bytecode trusted application) for any one application such as China Construction Bank, Agricultural Bank of China, etc., based on the trusted application development platform 12. The bytecode trusted application (called BTA for convenience of description) may be a trusted application developed based on the trusted application development platform 12 that is applicable to different TEE OSs and can be used across different TEE OS hardware platforms. In the present disclosure, only one corresponding trusted application may need to be developed for each application. Compared with related technologies where one trusted application needs to be developed for each different TEE OS hardware platform for each application and multiple different versions of the trusted application need to be developed for the same application, in the present disclosure, the development cycle of trusted applications and development costs may be reduced. At the same time, the purpose of "one development, multi-terminal deployment" may be achieved and rapid deployment and promotion of applications may be realized.

Figure 2:
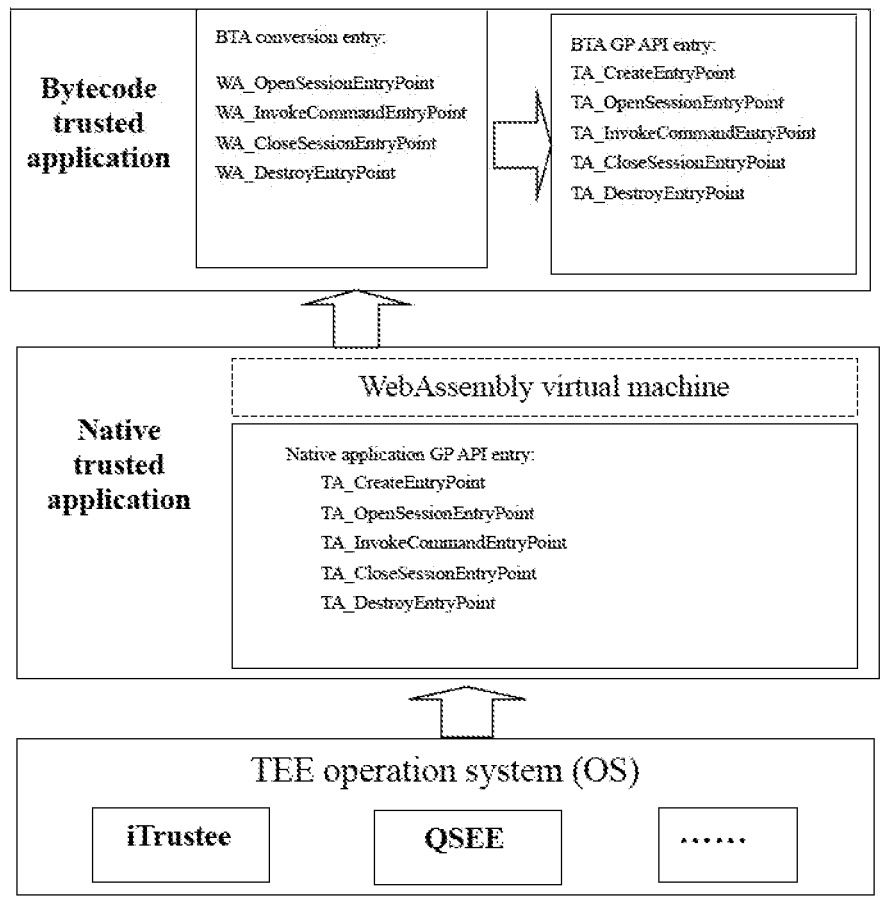
FIG. 2 illustrates another exemplary electronic device according to various disclosed embodiments of the present disclosure.

As shown in FIG. 2, in one embodiment, the trusted execution environment operating system (TEE OS) in the electronic device may receive the call information initiated by the CA11 and send the call information to the trusted application development platform 12. The trusted application development platform 12 may receive the call information sent by the TEE OS based on the global platform (GP) interface provided by the TEE OS (referred to as the first GP interface for convenience of description) or its own interface.

In one embodiment, a conversion interface may be configured in advance in the native trusted application 13 corresponding to the first identification information, and the native trusted application 13 corresponding to the first identification information may call the bytecode trusted application 14 corresponding to the identification information based on the preconfigured conversion interface.

In one embodiment, in related technologies, a large number of trusted applications have been developed, which are only suitable for a single TEE OS hardware platform such as Huawei iTrustee or Qualcomm QSEE, and cannot be used across different TEE OS hardware platforms (for convenience of description, called single trusted applications). These single trusted applications usually directly interact with the TEE OS based on the pre-configured GP interface. To enable these single trusted applications to be able to also run in the native trusted applications as BTA in the present disclosure, a GP interface (for convenience of description, called the second GP interface) for the bytecode trusted applications may be configured in advance, and any bytecode trusted applications (including single trusted applications) may receive the call of the native trusted application 13 corresponding to the first identification information based on this second GP interface.

In one embodiment, when it is necessary to use the security functions provided by the trusted execution environment (TEE), the client application (Client Application, CA) 11 in the electronic device may initiate the calling information of the native trusted application of TEE OS corresponding to the CA11 contained in trusted application development platform 12. For example, assuming that the TEE OS of the electronic device is Huawei iTrustee, the CA11 in the electronic device may initiate the call information of the native trusted application corresponding to the Huawei iTrustee TEE OS included in the trusted application development platform 12. In one embodiment, the calling information may carry the identification information of the electronic device (for convenience of description, called the first identification information) and the identification information of the bytecode trusted application of any application to be called (for convenience of description, called the second identification information). The first identification information and the second identification information may be flexibly set according to needs, and the present disclosure does not specifically limit this. For example, the first identification information of the electronic device may include identification information such as the model of the electronic device or the brand of the electronic device. In another embodiment, in addition to identifying information such as the model of the electronic device and the brand of the electronic device, the first identification information may also include the name and native trusted application version of the native trusted applications applicable to the electronic device. The second identification information of the bytecode trusted application may be identification information such as the name of the bytecode trusted application and the name of the supplier.

The CA11 may initiate the calling information. After receiving the calling information, the trusted application development platform 12 may, based on the first identification information of the electronic device carried in the calling information, determine a native TA corresponding to the first identification information of the electronic device from native TAs corresponding to at least two (or more) TEE OSs connected to the trusted application development platform 12 itself, and send the calling information to the Native TA corresponding to the first identification information. For example, when the brand of the electronic device is Huawei, the first identification information of the electronic device may include Huawei, the name of the native trusted application applicable to the Huawei-branded electronic device (terminal), or the native trusted application version number, etc. The trust application development platform 12 may determine a native trusted application corresponding to the Huawei iTrustee TEE OS as the native trusted application corresponding to the first identification information.

In one embodiment, native trusted applications corresponding to multiple (at least two) TEE OSs respectively may be directly integrated into the trusted application development platform 12. The trusted application development platform 12 may include (connect) multiple native trusted applications corresponding to each TEE OS. In some other embodiment, since the trusted application development platform 12 may occupy a large space when the native trusted applications corresponding to multiple TEE OSs are integrated into the trusted application development platform 12, to save space, the trusted application development platform 12 may initially include (connect) only the identification information of the native trusted applications corresponding to multiple TEE OSs. After the trusted application development platform 12 determines the identification information of the native trusted application corresponding to the first identification information of the electronic device according to the correspondence between the identification information of the electronic device and the identification information of the native trusted applications, the native trusted application corresponding to the first identification information may be downloaded and installed into the trusted application development platform 12 from the back-end application platform connected to the trusted application development platform 12 through the over-the-air download technology (OTA). In some other embodiments, after the trusted application development platform 12 includes the native trusted application corresponding to the first identification information, the first access request may be sent to the native trusted application (Native TA) corresponding to the first identification information.

In one embodiment, the bytecode trusted application (BTA) of at least one application may be installed in a set location such as the data area of the Native TA in advance, and the BTA may run within the Native TA based on the WebAssembly virtual machine. After receiving the call information, the Native TA13 of the first identification information may determine the BTA14 corresponding to the second identification information from at least one BTA installed in the Native TA13 based on the second identification information carried in the call information, and call the BTA14 corresponding to the second identification information based on the call information.

In one embodiment, the BTA 14 corresponding to the second identification information may receive a call from the Native TA13 of the first identification information, and may perform corresponding operations based on the call.

In the present disclosure, after CA11 initiates the calling information, the trusted application development platform 12 may receive the calling information, determine the native trusted application corresponding to the first identification information of the electronic device carried in the calling information from the native trusted applications corresponding to at least two (multiple) TEE OSs connected with the trusted application development platform 12, and send the calling information to the native trusted application corresponding to the first identification information. The native trusted application 13 corresponding to the first identification information may receive the calling information, determine the bytecode trusted application 14 corresponding to the second identification information from the at least one bytecode trusted application installed in itself based on the second identification information carried in the calling information, and call the bytecode trusted application 14 corresponding to the second identification information based on the calling information. The bytecode trusted application 14 corresponding to the second identification information may receive the call of the native trusted application 13 corresponding to the first identification information, and may execute the corresponding operation based on the native trusted application 14 corresponding to the first identification information. Therefore, the bytecode trusted application of the second identification information may be called accurately, realizing the management of multiple bytecode trusted applications in the native trusted application and realizing accurate management of trusted applications.

Embodiment 2

To accurately manage trusted applications, based on the above embodiments, in one embodiment, the native trusted application 13 corresponding to the first identification information may be configured to create a native trusted application instance when the received call information is an access request, open a native trusted application session based on the native trusted application instance, and send a first instruction for session opening to the bytecode trusted application 14 corresponding to the second identification information.

The bytecode trusted application 14 corresponding to the second identification information may be configured to create a bytecode trusted application instance when the first instruction is received and open a bytecode trusted application session based on the bytecode trusted application instance.

In one embodiment, the calling information initiated by the CA11 may be the access request. For example, in one embodiment, when the Native TA13 of the first identification information recognizes that the received call information is the access request, the native trusted application instance may be created first, the native trusted application session may be open based on the native trusted application instance, and the instruction for session opening (for convenience of description, it will be called the first instruction) may be sent to the BTA14 corresponding to the second identification information based on the second identification information carried in the access request. For example, as shown in FIG. 2, the Native TA13 of the first identification information may first create the native trusted application instance based on the instance creation entry function (TA_CreateEntryPoint), and initialize the running environment of the WebAssembly virtual machine of the bytecode trusted application. Then, the native trusted application session may be opened based on the session opening entry function (TA_OpenSessionEntryPoint). Based on the conversion interface, the session opening entry function (WA_OpenSessionEntryPoint) of the conversion entry of the bytecode trusted application may be called to send the first instruction for session opening to the BTA14 corresponding to the second identification information.

In one embodiment, after receiving the first instruction, the BTA 14 corresponding to the second identification information may create the bytecode trusted application instance, and open the bytecode trusted application session based on the bytecode trusted application instance. In one embodiment, after the BTA14 corresponding to the second identification information recognizes that the session opening entry function (WA_OpenSessionEntryPoint) of the conversion entry is called, the BTA14 corresponding to the second identification information may consider that the first instruction is received. Therefore, the BTA14 corresponding to the second identification information may first call the instance creation entry function (TA_CreateEntryPoint) of the bytecode trusted application to create the bytecode trusted application instance, and then call the session opening entry function (TA_OpenSessionEntryPoint) of the bytecode trusted application to open the bytecode trusted application. session, thereby opening the bytecode trusted application session corresponding to the second identification information.

In one embodiment, after the BTA14 of the second identification information opens the bytecode trusted application session, the Native TA13 of the first identification information may return confirmation information of successful session opening to the CA11. After receiving the confirmation information, the CA11 may initiate a calling instruction.

To accurately manage trusted applications, based on the above embodiments, in one embodiment, the native trusted application 13 corresponding to the first identification information may be configured to forward the calling instruction to the bytecode trusted application 14 corresponding to the second identification information when the received call information is the calling instruction.

In one embodiment, the calling information initiated by CA11 may be the calling instruction. When the Native TA13 of the first identification information recognizes that the received calling information is the calling instruction, the Native TA13 may forward the calling instruction (through, for example, transparent transmission, etc.) to the BTA14 corresponding to the second identification information. For example, as shown in FIG. 2, when the Native TA13 of the first identification information recognizes that the received call information is the call instruction, the Native TA13 may consider that it is necessary to call the instruction sending entry function (TA_InvokeInstructionEntryPoint) of the native trusted application, and call the instruction sending entry function (TA_InvokeInstructionEntryPoint) of the native trusted application based on the conversion interface. When recognizing the instruction sending entry function (WA_InvokeInstructionEntry) of the conversion entry of the bytecode trusted application is called, the BTA14 corresponding to the second identification information may call the instruction entry function (TA_InvokeInstructionEntryPoint) to receive the calling instruction forwarded by the native trusted application and perform the corresponding operations in the call instruction.

In one embodiment, after the BTA14 of the second identification information creates the bytecode trusted application instance and opens the bytecode trusted application session, the BTA14 of the second identification information may identify the location information of the own data storage location of the BTA14 corresponding to the second identification information, and return the location information to the native trusted application 13 corresponding to the first identification information. For example, the location information may be set in the session context (sessionContext), and the context pointer of the bytecode trusted application session may be returned to the native trusted application 13 corresponding to the first identification information through the session context bipolar pointer, thereby achieving the return of the location information to the native trusted application 13 corresponding to the first identification information. In one embodiment, the BTA may return the location information to the Native TA13 of the first identification information based on the following code:
TEE_Result TA_OpenSessionEntryPoint(uint32_t paramTypes,
TEE_Param params[4],
void **sessionContext).

When the Native TA13 of the first identification information receives the location information and forwards the calling instruction to the BTA14 corresponding to the second identification information, the Native TA13 may quickly and accurately forward the calling instruction to bytecode trusted application 14 corresponding to the second identification information identified by the location information based on the location information. In one embodiment, the calling instruction may be forwarded to the BTA14 corresponding to the second identification information based on the following code:

TEE_Result TA_InvokeCommandEntryPoint (void*sessionContext, uint32_t cmd_id, uint32_t paramTypes, TEE_Param params[4]).

In one embodiment, after the BTA 14 corresponding to the second identification information performs the corresponding operation according to the calling instruction, the execution result of the calling instruction may also be returned to the Native TA 13 of the first identification information. The Native TA13 of the first identification information may send the execution result to the CA11. In one embodiment, after receiving the execution result, the CA11 may initiate session closure information.

To accurately manage trusted applications, on the basis of the above embodiments, in one embodiment, the native trusted application 13 corresponding to the first identification information may be configured to: when the received call information is the session closure information, send a second instruction for session closure to the bytecode trusted application 14 corresponding to the second identification information, and close the native trusted application session.

The bytecode trusted application 14 corresponding to the second identification information may be configured to close the bytecode trusted application session and destroy the bytecode trusted application instance when the second instruction is received.

The native trusted application 13 corresponding to the first identification information may be configured to destroy the native trusted application instance.

In one embodiment, the calling information initiated by the CA11 may be the session closure information. As shown in FIG. 2, when the Native TA13 of the first identification information recognizes that the received call information is the session closure information, the Native TA13 may call the session closure entry function (TA_CloseSessionEntryPoint) of the native trusted application to close the native trusted application session, and call the session closure entry function (WA_CloseSessionEntryPoint) of the conversion entry of the bytecode trusted application based on the conversion interface to send the instruction for session closure to the BTA14 corresponding to the second identification information (for convenience of description, it is called the second instruction).

In one embodiment, after the session closure entry function (WA_CloseSessionEntryPoint) of the conversion entry of the BTA14 corresponding to the second identification information is called, the BTA14 corresponding to the second identification information may consider that the second instruction is received. Therefore, the BAT14 may call the session closure entry function (TA_CloseSessionEntryPoint) of the bytecode trusted application to close the bytecode trusted application session, and call the instance destroy entry function (TA_DestroyEntryPoint) of the bytecode trusted application to destroy the bytecode trusted application instance. Subsequently, the Native TA13 of the first identification information may call the native trusted application instance destroy function (TA_DestroyEntryPoint) of the native trusted application to destroy the native trusted application instance.

In another embodiment, after receiving the second instruction, the BTA14 corresponding to the second identification information may only call the session closure entry function (TA_CloseSessionEntryPoint) of the bytecode trusted application to close the bytecode trusted application session. Then the Native TA13 of the first identification information may call the native trusted application instance destroy function (TA_DestroyEntryPoint) of the native trusted application to destroy the native trusted application instance, and call the instance destroy entry function (WA_DestroyEntryPoint) of the conversion entry of the bytecode trusted application based on the conversion interface. After the BTA14 corresponding to the second identification information recognizes that the instance destroy entry function (WA_DestroyEntryPoint) of the conversion entry is called, the instance destroy entry function (TA_DestroyEntryPoint) of the bytecode trusted application may be called to implement the destruction of the trusted application instance.

Figure 3:
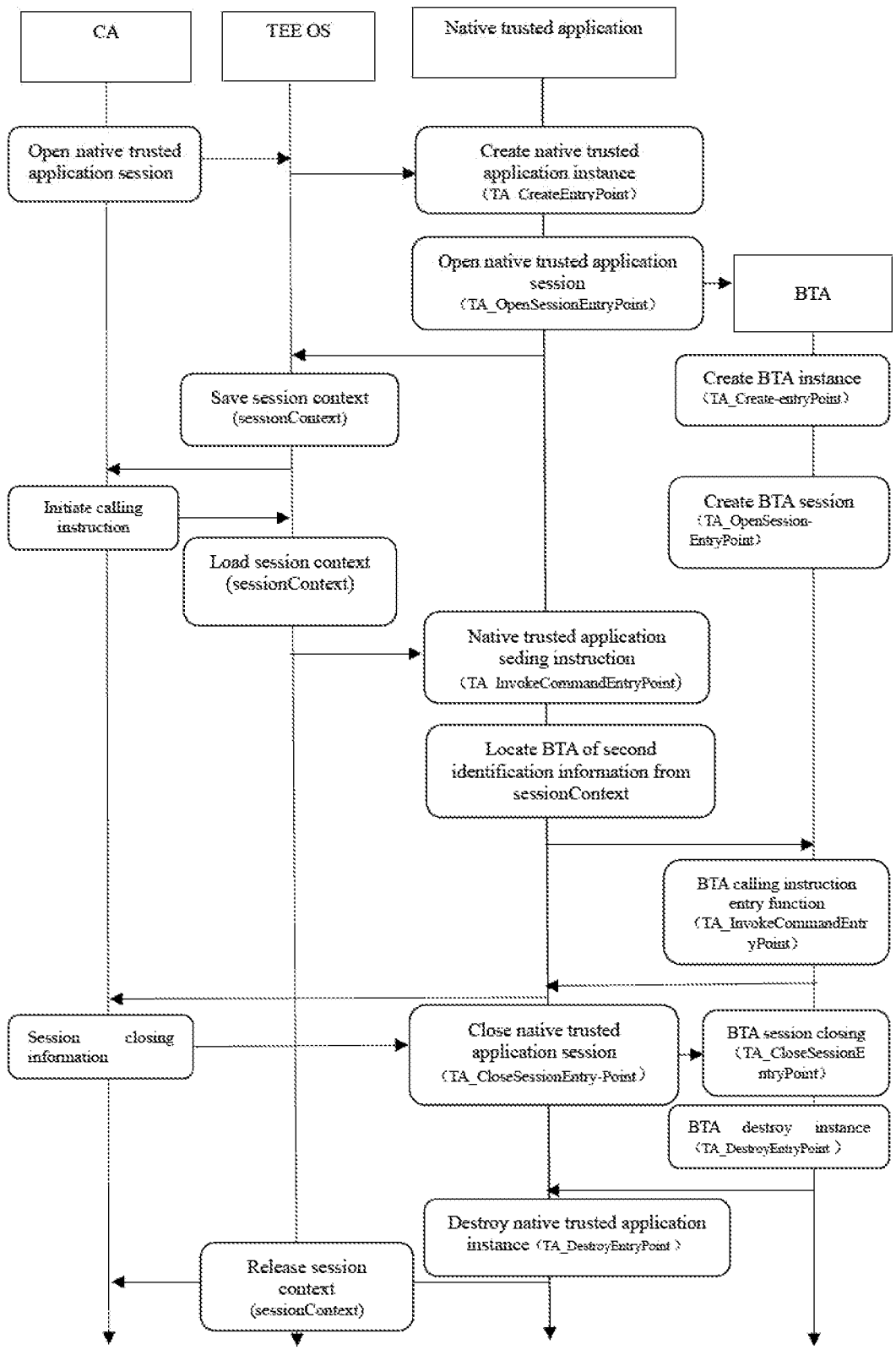
FIG. 3 illustrates an exemplary trusted application calling method according to various disclosed embodiments of the present disclosure.

To facilitate understanding, the trusted application calling process provided by the present disclosure will be illustrated below through a specific embodiment. FIG. 3 shows a schematic diagram of an exemplary trusted application calling process provided by some embodiments. As shown in FIG. 3, the CA11 in the electronic device may initiate an access request (opening a native trusted application session). In one embodiment, the CA11 may initiate the access request by calling the session opening function (TEEC_OpenSession). The access request may carry (specify) the first identification information of the electronic device and the second identification information of the bytecode trusted application of any one application to be called. In one embodiment, the CA11 may initiate the access request based on the following code:

PARAM[0]: TEE_PARAM_TYPE_VALUE_INOUT, params[0].value.a=INSTALL_TA–command ID
PARAM[1]: TEE_PARAM_TYPE_MEMREF_INPUT, params[1].memref.buffer–BTA name
PARAM[2]: TEE_PARAM_TYPE_MEMREF_INPUT, params[2].memref.buffer–SP name
PARAM[3]: TEE_PARAM_TYPE_MEMREF_INPUT, params[3].memref.buffer–the binary content of the BTA.

After the CA11 initiates the access request, the TEE OS in the electronic device may receive the access information initiated by the CA11 and send the calling information to the trusted application development platform 12. The trusted application development platform 12 may receive the access information, determine the native trusted application corresponding to the first identification information from the native trusted applications respectively corresponding to at least two trusted execution environment operating systems connected to the trusted application development platform 12 based on the first identification information, and send the calling information to the native trusted application corresponding to the first identification information.

The Native TA13 corresponding to the first identification information may first create a native trusted application instance based on the instance creation entry function (TA_CreateEntryPoint), open a native trusted application session based on the session opening entry function (TA_OpenSessionEntryPoint) subsequently, and call the session opening entry function (WA_OpenSessionEntryPoint) of the conversion entry of the bytecode trusted application based on the conversion interface to send the first instruction for session opening to the BTA14 corresponding to the second identification information.

After the BTA14 corresponding to the second identification information recognizes that the session opening entry function (WA_OpenSessionEntryPoint) of the conversion entry is called, the BTA14 corresponding to the second identification information may first call the instance creation entry function (TA_CreateEntryPoint) of the bytecode trusted application to create the bytecode trusted application instance, and then call the session opening entry function (TA_OpenSessionEntryPoint) of the bytecode trusted application to open (create) the bytecode trusted application session.

In one embodiment, after the BTA14 corresponding to the second identification information creates the bytecode trusted application instance and opens the bytecode trusted application session, the BTA14 corresponding to the second identification information may identify the own data storage location of the BTA14 corresponding to the second identification information, location information, and return the location information to the native trusted application 13 corresponding to the first identification information. The location information may be set in the session context (sessionContext), and the bytecode trusted application session context pointer may be returned to the native trusted application 13 corresponding to the first identification information through the session context bipolar pointer.

In one embodiment, when the Native TA13 corresponding to the first identification information receives the location information, the location information (sessionContext) may be saved in the native trusted application session context. TEE OS may also save the native trusted application session context (sessionContext).

The Native TA13 corresponding to the first identification information may return confirmation information of successful session opening to the CA11. After receiving the confirmation information, the CA11 may initiate a calling instruction. The TEE OS in the electronic device may receive the calling instruction initiated by the CA11, and send the calling instruction to the Native TA13 corresponding to the first identification information by loading and identifying the native trusted application session context.

When the Native TA13 corresponding to the first identification information recognizes that the received calling information is the calling instruction, the calling instruction may be forwarded to the BTA14 corresponding to the second identification information. The Native TA13 of the first identification information may call the instruction sending entry function (TA_InvokeCommandEntryPoint) of the native trusted application to locate the BTA14 corresponding to the second identification information from the session context (sessionContext), and call the instruction sending entry function (WA_InvokeCommandEntry) of the conversion entry of the BTA14 of the second identification information based on the conversion interface. When the BTA14 of the second identification information recognized that the instruction sending entry function is called, the BTA14 of the second identification information may call the instruction entry function (TA_InvokeCommandEntryPoint) to receive the command forwardred by the native trusted application and perform the corresponding operation in the calling instruction.

After the BTA 14 corresponding to the second identification information performs the corresponding operation according to the calling instruction, the execution result of the calling instruction may also be returned to the Native TA 13 corresponding to the first identification information. The Native TA13 corresponding to the first identification information may send the execution result to the CA11.

In one embodiment, after receiving the execution result, the CA11 may initiate the session closure information. The Native TA13 corresponding to the first identification information may receive the session closure information. When recognizing that the received call information is the session closure information, the Native TA13 may call the session closure entry function (TA_CloseSessionEntryPoint) of the native trusted application to close the native trusted application session, and call the session closure entry function (WA_CloseSessionEntryPoint) of the conversion entry of the bytecode trusted application based on the conversion interface. Therefore, the BTA14 corresponding to the second identification information may call the session closure entry function (TA_CloseSessionEntryPoint) of the bytecode trusted application to close the bytecode trusted application session, and destroy the bytecode trusted application instance by calling the instance destruction entry function (TA_DestroyEntryPoint) of the bytecode trusted application. The Native TA13 corresponding to the first identification information may then call the native trusted application instance destruction function (TA_DestroyEntryPoint) of the native trusted application to destroy the native trusted application instance. At the same time, the TEE OS may release the native trusted application session context (sessionContext).

Embodiment 3

To realize data storage isolation between a plurality of BTAs and ensure the data security of each BTA, based on the above embodiments, in one embodiment, the native trusted application 13 corresponding to the first identification information may be also used to configure an independent subdirectory for each bytecode trusted application respectively. For each bytecode trusted application, based on the independent subdirectory corresponding to the bytecode trusted application, a specific access path may be configured for the bytecode trusted application, such that the bytecode trusted application is able to access the file information in the corresponding independent subdirectory.

In one embodiment, when Native TA installs each BTA, the Native TA may configure an independent subdirectory for each BTA. For example, when any BTA performs the corresponding operation based on the calling and needs to open or create a file, the Native TA may always add the corresponding subdirectory as a prefix in the path to access files provided by the BTA. That is, the Native TA may configure a specific access path for each BTA based on the independent subdirectory corresponding to the BTA, such that the BTA is only able to access file information in the independent subdirectory corresponding to the BTA but cannot access file information in other directories.

In one embodiment, to achieve data storage isolation between the plurality of BTAs, the subdirectory and the path provided by one BTA to access the files may be an independent path (absolute path), rather than a relative path containing an expression such as ".." representing the upper-level directory, etc.

In the present disclosure, an independent subdirectory may be configured for each BTA, and each BTA may only be able to access the file information in its own unique subdirectory but cannot access the file information of other BTAs that do not belong to its own authority. Therefore, data storage isolation between the plurality of BTAs may be achieved to ensure data security.

Embodiment 4

Figure 4:
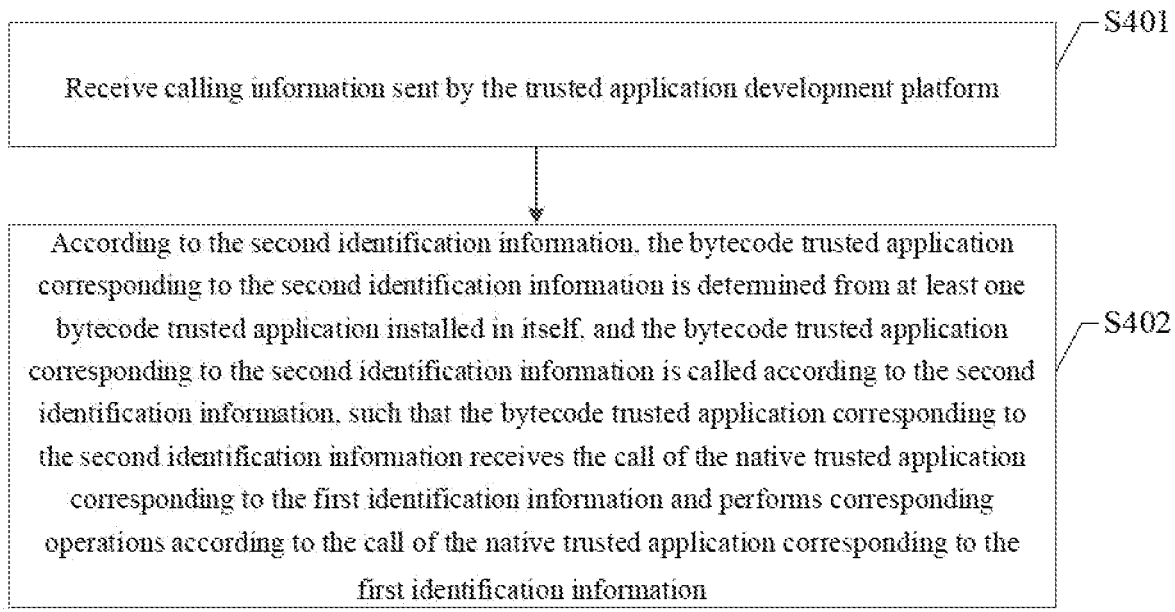
FIG. 4 illustrates another exemplary trusted application calling method according to various disclosed embodiments of the present disclosure.

The present disclosure also provides another trusted application calling method and the method may be applied to a native trusted application. FIG. 4 shows a flowchart of the trusted application calling method provided by one embodiment of the present disclosure. As shown in FIG. 4, the method may include S401 to S402.

In S401, calling information sent by the trusted application development platform may be received. The calling information may carry the first identification information of the electronic device and the second identification information of the bytecode trusted application of any application. The trusted application development platform receives the calling information of the native trusted application of the trusted execution environment operating system corresponding to the CA and being connected to the trusted application development platform, initiated by the CA. The calling information may be sent by the trusted application development platform when the trusted application development platform determines the native trusted application corresponding to the first identification information among the native trusted applications respectively corresponding to at least two trusted execution environment operating systems connected to the trusted application development platform based on the first identification information.

In S402, according to the second identification information, the bytecode trusted application corresponding to the second identification information may be determined from at least one bytecode trusted application installed in itself, and the bytecode trusted application corresponding to the second identification information may be called according to the second identification information, such that the bytecode trusted application corresponding to the second identification information receives the call of the native trusted application corresponding to the first identification information and performs corresponding operations according to the call of the native trusted application corresponding to the first identification information.

In one embodiment, when the received calling information is an access request, calling the bytecode trusted application corresponding to the second identification information according to the calling information may include:

creating a native trusted application instance, opening a native trusted application session according to the native trusted application instance, sending the first instruction for session opening to the bytecode trusted application corresponding to the second identification information, such that the bytecode trusted application corresponding to the second identification information creates a bytecode trusted application instance after receiving the first instruction and opens the bytecode trusted application session according to the bytecode trusted application instance.

In one embodiment, when the received calling information is a calling instruction, calling the bytecode trusted application corresponding to the second identification information according to the calling information may include:

forwarding the calling instruction to the bytecode trusted application corresponding to the second identification information.

In one embodiment, after receiving the calling information sent by the trusted application development platform and before forwarding the calling instruction to the bytecode trusted application corresponding to the second identification information, the method may further include:

receiving location information sent by the bytecode trusted application corresponding to the second identification information, where the location information is sent by the bytecode trusted application corresponding to the second identification information when recognizing the location information of its own data storage location.

Forwarding the calling instruction to the bytecode trusted application corresponding to the second identification information, may include:

forwarding the calling instruction to the bytecode trusted application corresponding to the second identification information identified by the location information according to the location information.

In one embodiment, the method may further include:

when receiving the execution result sent by the bytecode trusted application corresponding to the second identification information, sending the execution result to the CA; where the execution result is sent after the bytecode trusted application corresponding to the second identification information completes execution of the calling instruction.

In one embodiment, when the received calling information is session closure information, calling the bytecode trusted application corresponding to the second identification information according to the calling information may include:

closing the native trusted application session; sending the second instruction for session closure to the bytecode trusted application corresponding to the second identification information, such that the bytecode trusted application corresponding to the second identification information closes the bytecode trusted application session when receiving the second instruction and destroys the bytecode trusted application instance; and destroying the native trusted application instance.

In one embodiment, the method may further include:

configuring an independent subdirectory for each bytecode trusted application; and, for each bytecode trusted application, configuring a specific access path for the bytecode trusted application according to the independent subdirectory corresponding to the bytecode trusted application, such that the bytecode trusted application is able to access the file information in the corresponding independent subdirectory.

In one embodiment, calling the bytecode trusted application corresponding to the second identification information may include:

calling the bytecode trusted application corresponding to the second identification information based on a preset conversion interface.

Embodiment 5

Figure 5:
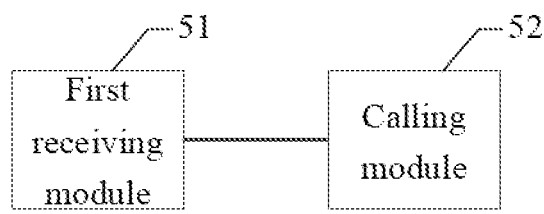
FIG. 5 illustrates an exemplary trusted application calling device according to various disclosed embodiments of the present disclosure.

The present disclosure also provides a trusted application calling device. The device may be applied to the native trusted application (the native trusted application corresponding to the first identification information). FIG. 5 illustrates a structure of an exemplary trusted application calling device provided by one embodiment of the present disclosure. As shown in FIG. 5, in one embodiment, the device may include:

a first receiving module 51, configured to receive the calling information sent by the trusted application development platform, where: the calling information may carry the first identification information of the electronic device and the second identification information of the bytecode trusted application of any application. The trusted application development platform receives the calling information of the native trusted application of the trusted execution environment operating system corresponding to the CA and being connected to the trusted application development platform, initiated by the CA. The calling information may be sent by the trusted application development platform when the trusted application development platform determines the native trusted application corresponding to the first identification information among the native trusted applications respectively corresponding to at least two trusted execution environment operating systems connected to the trusted application development platform based on the first identification information; and a calling module 52, configured to: according to the second identification information, determine the bytecode trusted application corresponding to the second identification information from at least one bytecode trusted application installed in itself, and call the bytecode trusted application corresponding to the second identification information according to the second identification information, such that the bytecode trusted application corresponding to the second identification information receives the call of the native trusted application corresponding to the first identification information and performs corresponding operations according to the call of the native trusted application corresponding to the first identification information.

In one embodiment, the calling module 52 may be configured to: when the received calling information is an access request, create a native trusted application instance, open a native trusted application session according to the native trusted application instance, send the first instruction for session opening to the bytecode trusted application corresponding to the second identification information, such that the bytecode trusted application corresponding to the second identification information creates a bytecode trusted application instance after receiving the first instruction and opens the bytecode trusted application session according to the bytecode trusted application instance.

In one embodiment, the calling module 52 may be configured to: when the received calling information is a calling instruction, forward the calling instruction to the bytecode trusted application corresponding to the second identification information.

In one embodiment, the calling module 52 may be further configured to: receive location information sent by the bytecode trusted application corresponding to the second identification information, where the location information is sent by the bytecode trusted application corresponding to the second identification information when recognizing the location information of its own data storage location.

In one embodiment, the calling module 52 may be further configured to: forward the calling instruction to the bytecode trusted application corresponding to the second identification information identified by the location information according to the location information.

In one embodiment, the device may further include:
a transmission module, configured to: when receiving the execution result sent by the bytecode trusted application corresponding to the second identification information, send the execution result to the CA; where the execution result is sent after the bytecode trusted application corresponding to the second identification information completes execution of the calling instruction.

In one embodiment, the calling module 52 may be further configured to: when the received calling information is session closure information, close the native trusted application session; send the second instruction for session closure to the bytecode trusted application corresponding to the second identification information, such that the bytecode trusted application corresponding to the second identification information closes the bytecode trusted application session when receiving the second instruction and destroys the bytecode trusted application instance; and destroy the native trusted application instance.

In one embodiment, the device may further include:
a configuration module, configured to: configure an independent subdirectory for each bytecode trusted application; and, for each bytecode trusted application, configure a specific access path for the bytecode trusted application according to the independent subdirectory corresponding to the bytecode trusted application, such that the bytecode trusted application is able to access the file information in the corresponding independent subdirectory.

In one embodiment, the calling module 52 may be configured to: call the bytecode trusted application corresponding to the second identification information based on a preset conversion interface.

Embodiment 6

Figure 6:
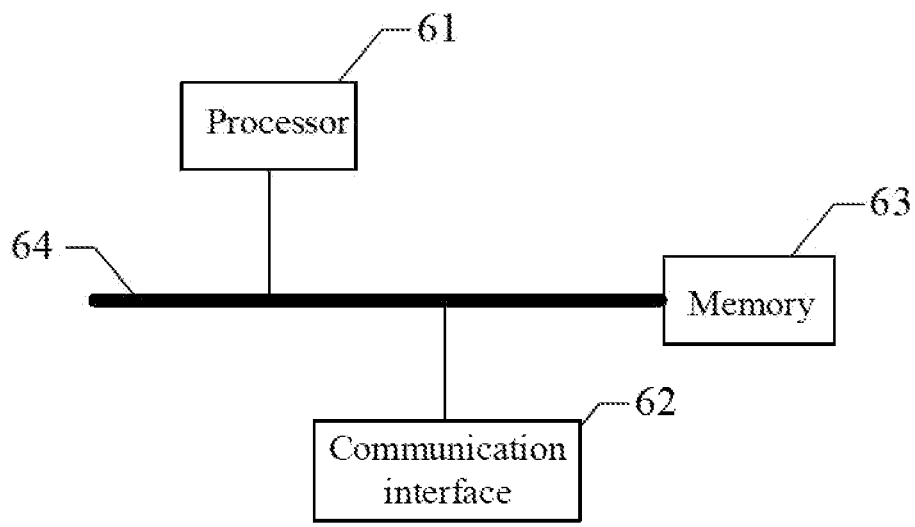
FIG. 6 illustrates another exemplary electronic device according to various disclosed embodiments of the present disclosure.

The present disclosure also provides an electronic device. FIG. 6 illustrates a structure of an exemplary electronic device provided by one embodiment of the present disclosure. As shown in FIG. 6, in the present embodiment, the electronic device may include a processor 61, a communication interface 62, a memory 63, and a communication bus 64. The processor 61, the communication interface 62 and the memory 63 may communicate with each other through the communication bus 64.

The memory 63 may be configured to store a computer program. When the computer program is executed by the processor 61, the processor 61 may perform the process including:
receiving calling information sent by the trusted application development, where: the calling information may carry the first identification information of the electronic device and the second identification information of the bytecode trusted application of any application; the trusted application development platform may receive the calling information of the native trusted application of the trusted execution environment operating system corresponding to the CA and being connected to the trusted application development platform, initiated by the CA. The calling information may be sent by the trusted application development platform when the trusted application development platform determines the native trusted application corresponding to the first identification information among the native trusted applications respectively corresponding to at least two trusted execution environment operating systems connected to the trusted application development platform based on the first identification information; and, according to the second identification information, determining the bytecode trusted application corresponding to the second identification information from at least one bytecode trusted application installed in itself, and calling the bytecode trusted application corresponding to the second identification information according to the second identification information, such that the bytecode trusted application corresponding to the second identification information receives the call of the native trusted application corresponding to the first identification information and performs corresponding operations according to the call of the native trusted application corresponding to the first identification information.

In one embodiment, the processor 61 may be configured to: when the received calling information is an access request, create a native trusted application instance, open a native trusted application session according to the native trusted application instance, send the first instruction for session opening to the bytecode trusted application corresponding to the second identification information, such that the bytecode trusted application corresponding to the second identification information creates a bytecode trusted application instance after receiving the first instruction and opens the bytecode trusted application session according to the bytecode trusted application instance.

In one embodiment, the processor 61 may be configured to: when the received calling information is a calling instruction, forward the calling instruction to the bytecode trusted application corresponding to the second identification information.

In one embodiment, the processor 61 may be further configured to: receiving location information sent by the bytecode trusted application corresponding to the second identification information, where the location information is sent by the bytecode trusted application corresponding to the second identification information when recognizing the location information of its own data storage location; and
forward the calling instruction to the bytecode trusted application corresponding to the second identification information identified by the location information according to the location information.

In one embodiment, the processor 61 may be configured to: when receiving the execution result sent by the bytecode trusted application corresponding to the second identification information, send the execution result to the CA; where the execution result is sent after the bytecode trusted application corresponding to the second identification information completes execution of the calling instruction.

In one embodiment, the processor 61 may be further configured to: when the received calling information is session closure information, close the native trusted application session; send the second instruction for session closure to the bytecode trusted application corresponding to the second identification information, such that the bytecode trusted application corresponding to the second identification information closes the bytecode trusted application session when receiving the second instruction and destroys the bytecode trusted application instance; and destroy the native trusted application instance.

In one embodiment, the processor 61 may be further configured to: configure an independent subdirectory for each bytecode trusted application; and, for each bytecode trusted application, configure a specific access path for the bytecode trusted application according to the independent subdirectory corresponding to the bytecode trusted application, such that the bytecode trusted application is able to access the file information in the corresponding independent subdirectory.

In one embodiment, the processor 61 may be configured to: call the bytecode trusted application corresponding to the second identification information based on a preset conversion interface.

The implementation and benefits of the electronic device may be similar to the trusted application calling method provided by previous embodiments of the present disclosure, and the references may be made to the above embodiments which will not be repeated here.

The communication bus may be a peripheral component interconnect (PCI) bus or an extended industry standard architecture (EISA) bus, etc. The communication bus may include an address bus, a data bus, a control bus, etc. For ease of presentation, only one thick line is used in the figure, but it does not mean that there is only one bus or one type of bus.

The communication interface 62 may be used for communication between the above-mentioned electronic device and other devices.

The memory may include a random access memory (RAM) or a non-volatile memory (Non-Volatile Memory, NVM), such as at least one disk memory. Optionally, the memory may also be at least one storage device located remotely from the aforementioned processor.

The above-mentioned processor may be a general-purpose processor, including a central processing unit or a network processor (NP), etc. In some other embodiments, the processor may also be a digital instruction processor (DSP), an application-specific integrated circuit, a field programmable gate array, or another programmable logic device, a discrete gate or transistor logic device, a discrete hardware component, etc.

Embodiment 7

The present disclosure also provides a computer-readable storage medium. The computer-readable storage medium may be configured to store a computer program capable of being executed by an electronic device. When the computer program is executed on the electronic device, the electronic device may be configured to perform steps including:
receiving calling information sent by the trusted application development, where: the calling information may carry the first identification information of the electronic device and the second identification information of the bytecode trusted application of any application. The trusted application development platform receives the calling information of the native trusted application of the trusted execution environment operating system corresponding to the CA and being connected to the trusted application development platform, initiated by the CA, and the calling information may be sent by the trusted application development platform when the trusted application development platform determines the native trusted application corresponding to the first identification information among the native trusted applications respectively corresponding to at least two trusted execution environment operating systems connected to the trusted application development platform based on the first identification information; and
according to the second identification information, determining the bytecode trusted application corresponding to the second identification information from at least one bytecode trusted application installed in itself, and calling the bytecode trusted application corresponding to the second identification information according to the second identification information, such that the bytecode trusted application corresponding to the second identification information receives the call of the native trusted application corresponding to the first identification information and performs corresponding operations according to the call of the native trusted application corresponding to the first identification information.

In one embodiment, when the received calling information is an access request, calling the bytecode trusted application corresponding to the second identification information according to the calling information may include:
creating a native trusted application instance, opening a native trusted application session according to the native trusted application instance, sending the first instruction for session opening to the bytecode trusted application corresponding to the second identification information, such that the bytecode trusted application corresponding to the second identification information creates a bytecode trusted application instance after receiving the first instruction and opens the bytecode trusted application session according to the bytecode trusted application instance.

In one embodiment, when the received calling information is a calling instruction, calling the bytecode trusted application corresponding to the second identification information according to the calling information may include:
forwarding the calling instruction to the bytecode trusted application corresponding to the second identification information.

In one embodiment, after receiving the calling information sent by the trusted application development platform and before forwarding the calling instruction to the bytecode trusted application corresponding to the second identification information, the method may further include:
receiving location information sent by the bytecode trusted application corresponding to the second identification information, where the location information is sent by the bytecode trusted application corresponding to the second identification information when recognizing the location information of its own data storage location.

Forwarding the calling instruction to the bytecode trusted application corresponding to the second identification information, may include:
forwarding the calling instruction to the bytecode trusted application corresponding to the second identification information identified by the location information according to the location information.

In one embodiment, the method may further include:
when receiving the execution result sent by the bytecode trusted application corresponding to the second identification information, sending the execution result to the CA; where the execution result is sent after the bytecode trusted application corresponding to the second identification information completes execution of the calling instruction.

In one embodiment, when the received calling information is session closure information, calling the bytecode trusted application corresponding to the second identification information according to the calling information may include:
closing the native trusted application session; sending the second instruction for session closure to the bytecode trusted application corresponding to the second identification information, such that the bytecode trusted application corresponding to the second identification information closes the bytecode trusted application session when receiving the second instruction and destroys the bytecode trusted application instance; and destroying the native trusted application instance.

In one embodiment, the method may further include:
configuring an independent subdirectory for each bytecode trusted application; and, for each bytecode trusted application, configuring a specific access path for the bytecode trusted application according to the independent subdirectory corresponding to the bytecode rusted application, such that the bytecode trusted application is able to access the file information in the corresponding independent subdirectory.

In one embodiment, calling the bytecode trusted application corresponding to the second identification information may include:
calling the bytecode trusted application corresponding to the second identification information based on a preset conversion interface.

The computer-readable storage media may be any available media or data storage devices that can be accessed by the processor in the electronic device, including but not limited to: magnetic storage devices including floppy disks, hard disks, tapes, magneto-optical disks (MO), etc., optical storage such as CD, DVD, BD, HVD, etc., or semiconductor memories such as ROM, EPROM, EEPROM, non-volatile memory (NAND FLASH), solid state drive (SSD), etc.

Embodiment 8

Figure 7:
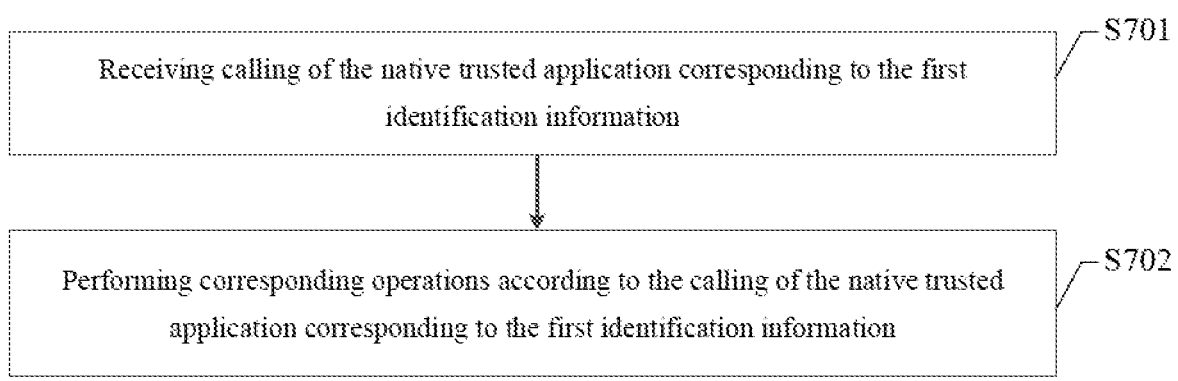
FIG. 7 illustrates another exemplary trusted application calling method according to various disclosed embodiments of the present disclosure.

One embodiment of the present disclosure also provides another trusted application calling method and the method may be applied to the bytecode trusted application. FIG. 7 illustrates the flowchart of the trusted application calling method provided by the present embodiment. As shown in FIG. 7, the method may include:

S701: receiving calling of the native trusted application corresponding to the first identification information, where: the calling is initiated by the native trusted application corresponding to the first identification information to the bytecode trusted application corresponding to the second identification information according to the calling information, when the native trusted application corresponding to the first identification information determines the bytecode trusted application corresponding to the second identification information from the at least one bytecode trusted application installed in the native trusted application corresponding to the first identification information according the second identification information in the calling information after receiving the calling information sent by the trusted application development platform; the trusted application development platform receives the calling information of the native trusted application of the trusted execution environment operating system corresponding to the CA and being connected to the trusted application development platform, initiated by the CA, and the calling information may be sent by the trusted application development platform when the trusted application development platform determines the native trusted application corresponding to the first identification information among the native trusted applications respectively corresponding to at least two trusted execution environment operating systems connected to the trusted application development platform based on the first identification information;

and S702: performing corresponding operations according to the calling of the native trusted application corresponding to the first identification information.

In one embodiment, performing the corresponding operations according to the calling of the native trusted application corresponding to the first identification information may include:
creating a bytecode trusted application instance when receiving the first instruction for session opening sent by the native trusted application corresponding to the first identification information, and opening the bytecode trusted application session based on the bytecode trusted application instance, where the first instruction is sent by the native trusted application corresponding to the first identification information when the native trusted application corresponding to the first identification information creates the native trusted application instance and opens the native trusted application session according to the native trusted application instance after the native trusted application corresponding to the first identification information recognized that the received calling information is the access request.

In one embodiment, after opening the bytecode trusted application session and before receiving the calling instruction forwarded by the native trusted application corresponding to the first identification information, the method may further include:

identifying the location information of the own data storage location, and returning the location information to the native trusted application corresponding to the first identification information, such that the native trusted application corresponding to the first identification information receives the location information and forwards the calling instruction to the bytecode trusted application corresponding to the second identification information identified by the location information based on the location information.

In one embodiment, the method may further include:

returning the execution result of the calling instruction to the native trusted application corresponding to the first identification information, such that the native trusted application corresponding to the first identification information sends the execution result to the CA.

In one embodiment, performing the corresponding operations according to the calling of the native trusted application corresponding to the first identification information may include:

when the second instruction for session closure sent by the native trusted application corresponding to the first identification information is received, closing the bytecode trusted application session and destroy the bytecode trusted application instance, where the second instruction is sent by the native trusted application corresponding to the first identification information to the bytecode trusted application corresponding to the second identification information when the call information received by the native trusted application corresponding to the first identification information is the session closure information.

In one embodiment, receiving the calling of the native trusted application corresponding to the first identification information may include:

receiving the calling of the native trusted application corresponding to the first identification information through a preset second GP interface.

Embodiment 9

Figure 8:
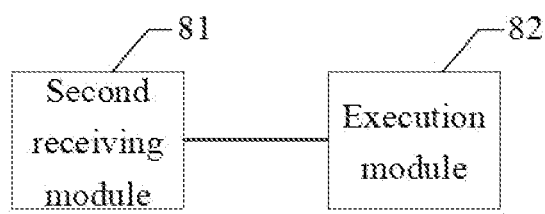
FIG. 8 illustrates another exemplary trusted application calling device according to various disclosed embodiments of the present disclosure.

One embodiment of the present disclosure also provides another trusted application calling device and the device may be applied to the bytecode trusted application. FIG. 8 illustrates the structure of the trusted application calling device provided by the present embodiment. As shown in FIG. 8, the device may include:

a second receiving module 81, configured to receive calling of the native trusted application corresponding to the first identification information, where: the calling is initiated by the native trusted application corresponding to the first identification information to the bytecode trusted application corresponding to the second identification information according to the calling information, when the native trusted application corresponding to the first identification information determines the bytecode trusted application corresponding to the second identification information from the at least one bytecode trusted application installed in the native trusted application corresponding to the first identification information according the second identification information in the calling information after receiving the calling information sent by the trusted application development platform; the trusted application development platform receives the calling information of the native trusted application of the trusted execution environment operating system corresponding to the CA and being connected to the trusted application development platform, initiated by the CA, and the calling information may be sent by the trusted application development platform when the trusted application development platform determines the native trusted application corresponding to the first identification information among the native trusted applications respectively corresponding to at least two trusted execution environment operating systems connected to the trusted application development platform based on the first identification information;

and an execution module 82, configured to: perform corresponding operations according to the calling of the native trusted application corresponding to the first identification information.

In one embodiment, the execution module 82 may be configured to: create a bytecode trusted application instance when receiving the first instruction for session opening sent by the native trusted application corresponding to the first identification information, and open the bytecode trusted application session based on the bytecode trusted application instance, where the first instruction is sent by the native trusted application corresponding to the first identification information when the native trusted application corresponding to the first identification information creates the native trusted application instance and opens the native trusted application session according to the native trusted application instance after the native trusted application corresponding to the first identification information recognized that the received calling information is the access request.

In one embodiment, the execution module 82 may be further configured to identify the location information of the own data storage location, and return the location information to the native trusted application corresponding to the first identification information, such that the native trusted application corresponding to the first identification information receives the location information and forwards the calling instruction to the bytecode trusted application corresponding to the second identification information identified by the location information based on the location information.

In one embodiment, the execution module 82 may be further configured to:

return the execution result of the calling instruction to the native trusted application corresponding to the first identification information, such that the native trusted application corresponding to the first identification information sends the execution result to the CA.

In one embodiment, the execution module 82 may be configured to: when the second instruction for session closure sent by the native trusted application corresponding to the first identification information is received, close the bytecode trusted application session and destroy the bytecode trusted application instance, where the second instruction is sent by the native trusted application corresponding to the first identification information to the bytecode trusted application corresponding to the second identification information when the call information received by the native trusted application corresponding to the first identification information is the session closure information.

In one embodiment, the second receiving module 81 may be configured to: receive the calling of the native trusted application corresponding to the first identification information through a preset second GP interface.

Embodiment 10

Figure 9:
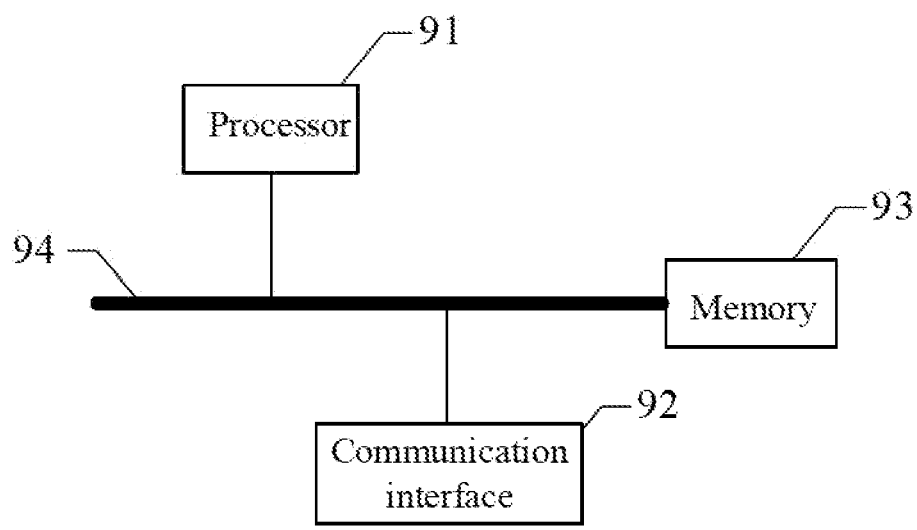
FIG. 9 illustrates another exemplary electronic device according to various disclosed embodiments of the present disclosure.

One embodiment of the present disclosure also provides another electronic device. FIG. 9 illustrates a structure of an exemplary electronic device provided by one embodiment of the present disclosure. As shown in FIG. 9, in the present embodiment, the electronic device may include a processor 91, a communication interface 92, a memory 93, and a communication bus 94. The processor 91, the communication interface 92 and the memory 93 may communicate with each other through the communication bus 94.

The memory 93 may be configured to store a computer program. When the computer program is executed by the processor 91, the processor 91 may be configured to:

receive calling of the native trusted application corresponding to the first identification information, where: the calling is initiated by the native trusted application corresponding to the first identification information to the bytecode trusted application corresponding to the second identification information according to the calling information, when the native trusted application corresponding to the first identification information determines the bytecode trusted application corresponding to the second identification information from the at least one bytecode trusted application installed in the native trusted application corresponding to the first identification information according the second identification information in the calling information after receiving the calling information sent by the trusted application development platform; the trusted application development platform receives the calling information of the native trusted application of the trusted execution environment operating system corresponding to the CA and being connected to the trusted application development platform, initiated by the CA, and the calling information may be sent by the trusted application development platform when the trusted application development platform determines the native trusted application corresponding to the first identification information among the native trusted applications respectively corresponding to at least two trusted execution environment operating systems connected to the trusted application development platform based on the first identification information;

and perform corresponding operations according to the calling of the native trusted application corresponding to the first identification information.

In one embodiment, the processor 91 may be configured to: create a bytecode trusted application instance when receiving the first instruction for session opening sent by the native trusted application corresponding to the first identification information, and open the bytecode trusted application session based on the bytecode trusted application instance, where the first instruction is sent by the native trusted application corresponding to the first identification information when the native trusted application corresponding to the first identification information creates the native trusted application instance and opens the native trusted application session according to the native trusted application instance after the native trusted application corresponding to the first identification information recognized that the received calling information is the access request.

In one embodiment, the processor 91 may be further configured to identify the location information of the own data storage location, and return the location information to the native trusted application corresponding to the first identification information, such that the native trusted application corresponding to the first identification information receives the location information and forwards the calling instruction to the bytecode trusted application corresponding to the second identification information identified by the location information based on the location information.

In one embodiment, the processor 91 may be further configured to:

return the execution result of the calling instruction to the native trusted application corresponding to the first identification information, such that the native trusted application corresponding to the first identification information sends the execution result to the CA.

In one embodiment, the processor 91 may be configured to: when the second instruction for session closure sent by the native trusted application corresponding to the first identification information is received, close the bytecode trusted application session and destroy the bytecode trusted application instance, where the second instruction is sent by the native trusted application corresponding to the first identification information to the bytecode trusted application corresponding to the second identification information when the call information received by the native trusted application corresponding to the first identification information is the session closure information.

In one embodiment, the processor 91 may be configured to: receive the calling of the native trusted application corresponding to the first identification information through a preset second GP interface.

The communication bus may be a peripheral component interconnect (PCI) bus or an extended industry standard architecture (EISA) bus, etc. The communication bus may include an address bus, a data bus, a control bus, etc. For ease of presentation, only one thick line is used in the figure, but it does not mean that there is only one bus or one type of bus.

The communication interface 92 may be used for communication between the above-mentioned electronic device and other devices.

The memory may include a random access memory (RAM) or a non-volatile memory (Non-Volatile Memory, NVM), such as at least one disk memory. Optionally, the memory may also be at least one storage device located remotely from the aforementioned processor.

The above-mentioned processor may be a general-purpose processor, including a central processing unit or a network processor (NP), etc. In some other embodiments, the processor may also be a digital instruction processor (DSP), an application-specific integrated circuit, a field programmable gate array, or another programmable logic device, a discrete gate or transistor logic device, a discrete hardware component, etc.

Embodiment 11

The present disclosure also provides another computer-readable storage medium. The computer-readable storage medium may be configured to store a computer program capable of being executed by an electronic device. When the computer program is executed on the electronic device, the electronic device may be configured to perform:

receiving calling of the native trusted application corresponding to the first identification information, where: the calling is initiated by the native trusted application corresponding to the first identification information to the bytecode trusted application corresponding to the second identification information according to the calling information, when the native trusted application corresponding to the first identification information determines the bytecode trusted application corresponding to the second identification information from the at least one bytecode trusted application installed in the native trusted application corresponding to the first identification information according the second identification information in the calling information after receiving the calling information sent by the trusted application development platform; the trusted application development platform receives the calling information of the native trusted application of the trusted execution environment operating system corresponding to the CA and being connected to the trusted application development platform, initiated by the CA, and the calling information may be sent by the trusted application development platform when the trusted application development platform determines the native trusted application corresponding to the first identification information among the native trusted applications respectively corresponding to at least two trusted execution environment operating systems connected to the trusted application development platform based on the first identification information;

and performing corresponding operations according to the calling of the native trusted application corresponding to the first identification information.

In one embodiment, performing the corresponding operations according to the calling of the native trusted application corresponding to the first identification information may include:

creating a bytecode trusted application instance when receiving the first instruction for session opening sent by the native trusted application corresponding to the first identification information, and opening the bytecode trusted application session based on the bytecode trusted application instance, where the first instruction is sent by the native trusted application corresponding to the first identification information when the native trusted application corresponding to the first identification information creates the native trusted application instance and opens the native trusted application session according to the native trusted application instance after the native trusted application corresponding to the first identification information recognized that the received calling information is the access request.

In one embodiment, after opening the bytecode trusted application session and before receiving the calling instruction forwarded by the native trusted application corresponding to the first identification information, the method may further include:

identifying the location information of the own data storage location, and returning the location information to the native trusted application corresponding to the first identification information, such that the native trusted application corresponding to the first identification information receives the location information and forwards the calling instruction to the bytecode trusted application corresponding to the second identification information identified by the location information based on the location information.

In one embodiment, the method may further include:

returning the execution result of the calling instruction to the native trusted application corresponding to the first identification information, such that the native trusted application corresponding to the first identification information sends the execution result to the CA.

In one embodiment, performing the corresponding operations according to the calling of the native trusted application corresponding to the first identification information may include:

when the second instruction for session closure sent by the native trusted application corresponding to the first identification information is received, closing the bytecode trusted application session and destroy the bytecode trusted application instance, where the second instruction is sent by the native trusted application corresponding to the first identification information to the bytecode trusted application corresponding to the second identification information when the call information received by the native trusted application corresponding to the first identification information is the session closure information.

In one embodiment, receiving the calling of the native trusted application corresponding to the first identification information may include:

receiving the calling of the native trusted application corresponding to the first identification information through a preset second GP interface.

The computer-readable storage media may be any available media or data storage devices that can be accessed by the processor in the electronic device, including but not limited to: magnetic storage devices including floppy disks, hard disks, tapes, magneto-optical disks (MO), etc., optical storage such as CD, DVD, BD, HVD, etc., or semiconductor memories such as ROM, EPROM, EEPROM, non-volatile memory (NAND FLASH), solid state drive (SSD), etc.

Those skilled in the art will understand that various embodiments of the present disclosure may be provided as methods, systems, or computer program products. Accordingly, the present disclosure may take the forms of an entirely hardware embodiment, an entirely software embodiment, or an embodiment that combines software and hardware aspects. Furthermore, the present disclosure may take the form of a computer program product embodied on one or more computer-usable storage media (including, but not limited to, disk storage, CD-ROM, optical storage, etc.) including computer-usable program codes embodied therein.

The present disclosure is described with reference to flowchart illustrations and/or block diagrams of methods, apparatus (systems), and computer program products according to the present disclosure. It will be understood that each process and/or block in the flowchart illustrations and/or block diagrams, and combinations of processes and/or blocks in the flowchart illustrations and/or block diagrams, may be implemented by computer program instructions. These computer program instructions may be provided to a processor of a general purpose computer, a special purpose computer, an embedded processor, or another programmable data processing device to produce a machine, such that the instructions executed by the processor of the computer or other programmable data processing devices form a device for realizing the functions specified in a process or processes in a flowchart and/or a block or blocks in a block diagram.

These computer program instructions may also be stored in a computer-readable memory that causes a computer or other programmable data processing apparatus to operate in a particular manner, such that the instructions stored in the computer-readable memory produce a product including the instruction device. The instruction device may implement the functions specified in a process or processes in the flowchart and/or in a block or blocks in the block diagram.

These computer program instructions may also be loaded onto a computer or another programmable data processing device, causing a series of operating steps to be performed on the computer or another programmable device to produce computer-implemented processing, thereby executing the processes for implementing the functions specified in a process or processes of a flowchart diagram and/or a block or blocks of a block diagram on the computer or other programmable device.

Obviously, those skilled in the art may make various changes and modifications to the present disclosure without departing from the spirit and scope of the present disclosure. In this way, if these modifications and variations of the present disclosure fall within the scope of the claims of the present disclosure and equivalent technologies, the present disclosure is also intended to include these modifications and variations.

What is claimed is:

1. An electronic device, comprising a client application CA and a trusted application development platform, wherein:
   the CA is configured to initiate call information of a native trusted application of a trusted execution environment operating system corresponding to the CA and connected to the trusted application development platform, wherein the call information carries first identification information of the electronic device and second identification information of a bytecode trusted application of any application;
   the trusted application development platform is configured to receive the calling information, and determine the native trusted application corresponding to the first identification information from native trusted applications corresponding to at least two trusted execution environment operating systems respectively connected to the trusted application development platform according to the first identification information, and send the calling information to the native trusted application corresponding to the first identification information;
   the native trusted application corresponding to the first identification information is configured to receive the calling information, determine a bytecode trusted application corresponding to the second identification information from at least one bytecode trusted application installed in the native trusted application according to the second identification information, and call the bytecode trusted application corresponding to the second identification information according to the calling information; and
   the bytecode trusted application corresponding to the second identification information is configured to receive a call of the native trusted application corresponding to the first identification information, and perform corresponding operations based on the call of the native trusted application corresponding to the first identification information,
   wherein the native trusted application corresponding to the first identification information is further configured to: configure an independent subdirectory for each bytecode trusted application respectively; and for each bytecode trusted application, based on the independent subdirectory corresponding to the bytecode trusted application, configure a specific access path for the bytecode trusted application, such that the bytecode trusted application is able to access the file information in the corresponding independent subdirectory; and
   the bytecode trusted application corresponding to the second identification information is developed based on the trusted application development platform, and is configured to be applied in the at least two trusted execution environment operating systems.

2. The electronic device according to claim 1, further comprising:
   a creation module, configured to create the trusted application development platform based on bytecode technology that supports cross-platform functions, wherein the trusted application development platform connects the native trusted applications corresponding to the at least two trusted execution environment operating systems.

3. The electronic device according to claim 1, wherein:
   the native trusted application corresponding to the first identification information is configured to create a native trusted application instance when the received calling information is an access request, open a native trusted application session based on the native trusted application instance, and send a first instruction for session opening to the bytecode trusted application corresponding to the second identification information; and
   the bytecode trusted application corresponding to the second identification information is configured to: create a bytecode trusted application instance when receiving the first instruction, and open a bytecode trusted application session according to the bytecode trusted application instance.

4. The electronic device according to claim 1, wherein:
   the native trusted application corresponding to the first identification information is configured to: when the received calling information is a calling instruction, forward the calling instruction to the bytecode trusted application corresponding to the second identification information.

5. The electronic device according to claim 4, wherein:
   the bytecode trusted application corresponding to the second identification information is further configured to identify location information of own data storage location of the bytecode trusted application, and return the location information to the native trusted application corresponding to the first identification information; and
   the native trusted application corresponding to the first identification information is further configured to: when receiving the location information, forward the calling instruction to the bytecode trusted application corresponding the second identification information identified by the location information.

6. The electronic device according to claim 4, wherein:
   the bytecode trusted application corresponding to the second identification information is further configured to return execution results of the calling instruction to the native trusted application corresponding to the first identification information; and
   the native trusted application corresponding to the first identification information is further configured to transmit the execution results to the CA.

7. The electronic device according to claim 3, wherein:
the native trusted application corresponding to the first identification information is further configured to: when the received calling information is session closure information, send a second instruction for session closure to the bytecode trusted application corresponding to the second identification information and close the native trusted application session;
the bytecode trusted application corresponding to the second identification information is further configured to: when receiving the second instruction, close the bytecode trusted application session and destroy the bytecode trusted application instance; and
the native trusted application corresponding to the first identification information is further configured to destroy the native trusted application instance.

8. The electronic device according to claim 1, further comprising a trusted execution environment operating system TEE OS, wherein:
the TEE OS is configured to receive the calling information initiated by the CA and send the calling information to the trusted application development platform; and
the trusted application development platform is configured to receive the calling information sent by the TEE OS through a first global organization GP interface provided by the TEE OS or its own interface.

9. The electronic device according to claim 1, wherein:
the native trusted application corresponding to the first identification information is further configured to call the bytecode trusted application corresponding to the second identification information based on a preset conversion interface; and
the bytecode trusted application corresponding to the second identification information is configured to receive the call of the native trusted application corresponding to the first identification information based on a preset second GP interface.

10. A trusted application calling method applied to a native trusted application, comprising:
receiving call information sent by a trusted application development platform, wherein:
the call information carries first identification information of an electronic device and second identification information of a bytecode trusted application of any application;
the trusted application development platform determines the native trusted application corresponding to the first identification information from native trusted applications respectively corresponding to at least two trusted environment operating systems connected to the trusted application development platform according to the first identification information when the trusted application development platform receives the calling information initiated by a client application CA to a native trusted application of a trusted environment operating system corresponding to the CA and connected to the trusted application development platform, and sends the calling information;
determining a bytecode trusted application corresponding to the second identification information from at least one bytecode trusted application installed in the native trusted application according to the second identification information; and
calling the bytecode trusted application corresponding to the second identification information according to the calling information, such that the bytecode trusted application corresponding to the second identification information receives a call of the native trusted application corresponding to the first identification information and performs corresponding operations based on the call of the native trusted applications corresponding to the first identification information,
wherein:
the method further comprises: configuring an independent subdirectory for each bytecode trusted application respectively; and, for each bytecode trusted application, based on the independent subdirectory corresponding to the bytecode trusted application, configuring a specific access path for the bytecode trusted application, such that the bytecode trusted application is able to access the file information in the corresponding independent subdirectory; and
the bytecode trusted application corresponding to the second identification information is developed based on the trusted application development platform, and is configured to be applied in the at least two trusted execution environment operating systems.

11. The electronic device according to claim 1, wherein:
the native trusted application corresponding to the first identification information is configured to add the corresponding subdirectory as a prefix in the access path to access files provided by the bytecode trusted application corresponding to the second identification information.

12. The electronic device according to claim 1, wherein:
the access path for the bytecode trusted application is an absolute path.

13. The method according to claim 10, wherein:
when the received calling information is an access request, calling the bytecode trusted application corresponding to the second identification information according to the calling information includes:
creating a native trusted application instance, opening a native trusted application session based on the native trusted application instance, and sending a first instruction for session opening to the bytecode trusted application corresponding to the second identification information, such that the bytecode trusted application corresponding to the second identification information creates a bytecode trusted application instance when receiving the first instruction and opens a bytecode trusted application session according to the bytecode trusted application instance.

14. The method according to claim 10, wherein:
when the received calling information is a calling instruction, calling the bytecode trusted application corresponding to the second identification information according to the calling information includes:
forwarding the calling instruction to the bytecode trusted application corresponding to the second identification information.

15. The method according to claim 14, after receiving the calling information sent by the trusted application development platform and before forwarding the calling instruction to the bytecode trusted application corresponding to the second identification information, further comprising:
receiving location information sent by the bytecode trusted application corresponding to the second identification information, wherein the location information is sent by the bytecode trusted application corresponding to the second identification information when the bytecode trusted application corresponding to the second identification information identifies the location information of the own data storage location.

16. The method according to claim 15, wherein:
forwarding the calling instruction to the bytecode trusted application corresponding to the second identification information includes:
forwarding the calling instruction to the bytecode trusted application corresponding to the second identification information identified by the location information, according to the location information.

17. The method according to claim 10, further comprising:
returning execution results of the calling instruction to the native trusted application corresponding to the first identification information, wherein the execution results are sent by the bytecode trusted application corresponding the second identification information when finishing execution of the calling instruction.

18. The method according to claim 10, wherein:
when the received calling information is session closure information, calling the bytecode trusted application corresponding to the second identification information according to the calling information includes:
closing the native trusted application session; sending a second instruction for session closure to the bytecode trusted application corresponding to the second identification information, such that the bytecode trusted application corresponding to the second identification information closes the bytecode trusted application session and destroys the bytecode trusted application instance when receiving the second instruction; and destroying the native trusted application instance.

19. The method according to claim 10, wherein:
calling the bytecode trusted application corresponding to the second identification information includes:
calling the bytecode trusted application corresponding to the second identification information based on a preset conversion interface.

20. A trusted application calling method applied to a bytecode trusted application, comprising:
receiving a call of a native trusted application corresponding to first identification information, wherein:
the native trusted application corresponding to the first identification information determines the bytecode trusted application corresponding to second identification information from at least one bytecode trusted application installed in the native trusted application corresponding to the first identification information according to the second identification information carried in calling information when the native trusted application corresponding to the first identification information receives the calling information sent by the trusted application development platform, and initiates the call with respect to the bytecode trusted application corresponding to the second identification information; and
the trusted application development platform determines the native trusted application corresponding to the first identification information from native trusted applications respectively corresponding to at least two trusted environment operating systems connected to the trusted application development platform according to the first identification information when the trusted application development platform receives the calling information initiated by a client application CA to a native trusted application of a trusted environment operating system corresponding to the CA and connected to the trusted application development platform, and sends the calling information; and
performing corresponding operations based on the call of the native trusted application corresponding to the first identification information,
wherein the native trusted application corresponding to the first identification information is configured to: configure an independent subdirectory for each bytecode trusted application respectively; and for each bytecode trusted application, based on the independent subdirectory corresponding to the bytecode trusted application, configure a specific access path for the bytecode trusted application, such that the bytecode trusted application is able to access the file information in the corresponding independent subdirectory; and
the bytecode trusted application corresponding to the second identification information is developed based on the trusted application development platform, and is configured to be applied in the at least two trusted execution environment operating systems.

\* \* \* \* \*